(12) United States Patent
Jenkins et al.

(10) Patent No.: US 7,793,030 B2
(45) Date of Patent: Sep. 7, 2010

(54) ASSOCIATION OF MULTIPLE PCI EXPRESS LINKS WITH A SINGLE PCI EXPRESS PORT

(75) Inventors: Peter Joel Jenkins, Colchester, VT (US); Paul Joseph Mattos, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/875,974

(22) Filed: Oct. 22, 2007

(65) Prior Publication Data

US 2009/0106476 A1    Apr. 23, 2009

(51) Int. Cl.
G06F 13/40    (2006.01)

(52) U.S. Cl. .................. 710/307; 710/313; 370/276; 370/433; 713/320; 713/323

(58) Field of Classification Search ........... 710/313, 710/307; 370/276, 433; 713/320, 323
See application file for complete search history.

(56) References Cited

U.S. PATENT DOCUMENTS

| | | | |
|---|---|---|---|
| 7,137,018 B2 * | 11/2006 | Gutman et al. | 713/323 |
| 7,184,708 B1 * | 2/2007 | Kwa et al. | 455/63.1 |
| 7,325,086 B2 * | 1/2008 | Kong et al. | 710/307 |
| 7,424,565 B2 * | 9/2008 | Sandven et al. | 710/310 |
| 2007/0211746 A1 * | 9/2007 | Oshikiri et al. | 370/437 |

OTHER PUBLICATIONS

PCI-SIG. PCI Express Base Specification. Revision 1.0a. Apr. 15, 2003.*
PCI-SIG. PCI Express Base Specification. Revision 1.0. Apr. 29, 2002.*
Brierley-Green et al. A Low-Cost Programmable PCI Express Solution. Xcell Journal. Third Quarter. 2005.*
Gupta et al. Using PCI Express Technology in High-Performance Computing Clusters. Dell Power Solutions. Nov. 2005.*
Bhatt, Ajay. Creating a PCI Express Interconnect. White Paper. 2002.*

* cited by examiner

*Primary Examiner*—Mark Rinehart
*Assistant Examiner*—Matthew D Spittle
(74) *Attorney, Agent, or Firm*—Schmeiser, Olsen & Watts; Michael J. LeStrange

(57) ABSTRACT

A method and apparatus for association of multiple PCI Express links with a single PCI Express port. The method includes: connecting a first bus interface component to a second bus interface component with a set of K lanes and set of N lanes, each lane of the set of K lanes and each lane of the set of N lanes consisting of a unidirectional and differentially driven transmitter signal pair and a unidirectional and differentially driven receiver signal pair, wherein K and N are independently whole positive integers equal to or greater than 1.

22 Claims, 12 Drawing Sheets

US 7,793,030 B2

ASSOCIATION OF MULTIPLE PCI EXPRESS LINKS WITH A SINGLE PCI EXPRESS PORT

FIELD OF THE INVENTION

The present invention relates to the field of peripheral component interconnect (PCI) Express (or PCIe) architecture and methodology; more specifically, it relates to a method and architecture to allowing association of multiple PCI Express links with a single PCI Express port.

BACKGROUND OF THE INVENTION

Two interconnected PCI Express components are required to form at least one PCI Express link per port. Ports with more than a single lane may form a single link, which uses all available lanes or may optionally be sub-divided into multiple links with each link connected to a different PCI Express component. However, all traffic between any two PCI Express components travels on the same link, which can inefficiently use bandwidth and power as small data packets with low priority travel on the same link and at the same data rate as large data packets with high priority. Therefore, there is a need for a method to more efficiently utilize bandwidth and power.

SUMMARY OF THE INVENTION

A first aspect of the present invention is a method, comprising: connecting a first bus interface component to a second bus interface component with a set of K lanes and set of N lanes, each lane of the set of K lanes and each lane of the set of N lanes consisting of both a unidirectional and differentially driven transmitter signal pair and a unidirectional and differentially driven receiver signal pair, wherein K and N are independently positive integers equal to or greater than 1.

A second aspect of the present invention is a method, comprising: connecting a bus interface component to a second bus interface component with X links, each lane of each link of the X links comprising respective N1 to NX sets of lanes, each set of lanes of the N1 to NX sets of lanes consisting of a unidirectional and differentially driven transmitter signal pair and a unidirectional and differentially driven receiver signal pair, wherein X is a positive integer equal to or greater than 2 and each N1 to NX is independently a whole positive integer equal to or greater than 1.

A third aspect of the present invention is a Peripheral Component Interconnect (PCI) Express compliant apparatus, comprising: a first bus interface component; a second bus interface component; a first link having a set of K lanes connecting the first and second bus interface components, each lane of the set of K lanes consisting of a unidirectional and differentially driven transmitter signal pair and a unidirectional and differentially driven receiver signal pair; and a second link having a set of N lanes connecting the first and second bus interface components, each lane of the set of N lanes consisting of a unidirectional and differentially driven transmitter signal pair and a unidirectional and differentially driven receiver signal pair, wherein K and N are independently positive integers equal to or greater than 1.

A fourth aspect of the present invention is a Peripheral Component Interconnect (PCI) Express compliant apparatus, comprising: a first bus interface component; a second bus interface component; X links connecting the first bus interface to the second bus interface, each link of the X links comprising respective N1 to NX sets of lanes, lane of each set of lanes of the N1 to NX sets of lanes consisting of a unidirectional and differentially driven transmitter signal pair and a unidirectional and differentially driven receiver signal pair, wherein X is a whole positive integer equal to or greater than 2 and each N1 to NX is independently a positive integer equal to or greater than 1.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1:
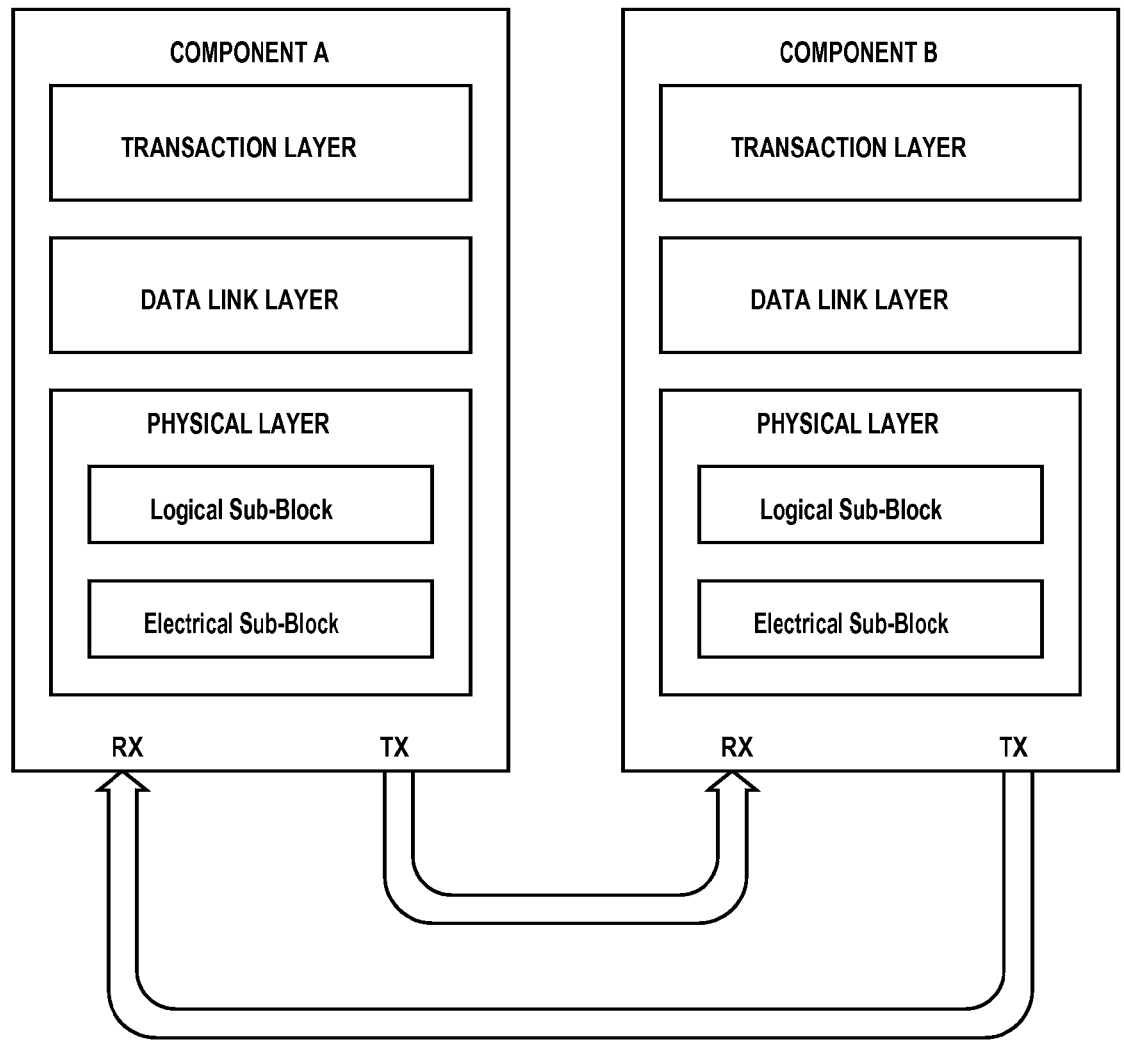
FIG. 1, is a diagram of two components connected by PCI Express Protocol.

FIG. 1 is a diagram of two components connected by PCI Express Protocol. PCI Express (also known as PCIe) is a layered communication protocol consisting of a transaction layer, a data link layer and a physical layer. The physical layer is further subdivided into a logical sub-layer and an electrical sub-layer. PCI Express is based on dual-simplex communication channels between two PCI Express components. The fundamental PCI Express link consists of a pair of low-voltage, unidirectional and differentially driven signal pairs (also known as lanes) with one pair designated for transmitter (TX) functions and the other pair designated for receiver (RX) functions. A port is defined logically as an interface between a component and a PCI Express link and physically as a group of transmitters and receivers located on the same integrated circuit chip that define a link. A link is defined as a collection of two ports and their interconnecting lanes. The designations xK (by K) or xN (by N) indicate the number of lanes in a link. An xX lane therefore includes xX transmit lanes and xX receive lanes. Lanes in a link transmit data in parallel. Each parallel data path is clocked at a certain frequency to keep up with the link data rate. The link data rate is the physical signal-encoding rate of the link expressed in giga-transfers/sec (GT/s). Since the encoding overhead in PCI Express is 10 bits/byte, for a 2.5 GT/s link data rate each lane has a data rate of 250 MB/s in each direction. Since each lane is capable of 250 MB/sec, a x8 link would be capable of 250*8*2=4 GB/s and a x16 lane would be capable of 250*16*2=8 GB/s. For a 5.0 GT/s link data rate each lane has a data rate of 500 MB/s. Thus, an x16 link can transfer date at 16 GB/s.

The number of physical wires (the data bus width) in a link will vary depending upon implementation. For an x8 link with a link physical signaling rate of 2.5 GT/s a 64-bit data bus would need to be clocked at 250 MHz. However, the data width could be doubled to 128 bits while the clock is halved to 125 MHz. In a second example, for a link data rate of 5.0 GT/s, a 64-bit data bus for a x8 link would need to be clocked at 500 MHz in order to keep up with the link data rate. The more lanes, the lower the clock frequency can be.

Figure 2:
FIG. 2, is a diagram of the construction of data packets according to the PCI Express protocol.

FIG. 2 is a diagram of the construction of transaction layer packets (TLPs) for transmitting data according to the PCI Express protocol. PCI Express uses packets to communicate information between components. Packets are formed in the transaction layer and comprise a header, and optionally data and optionally ECRC check code. In the data link layer a sequence number is appended before the header and a link cyclic redundancy check code (LCRC) is added to the end of the packet. In the physical layer, framing is added before the sequence number and after the LCRC code.

PCI Express is described in detail in the PCI Express Base Specification, Revision 2.0 Dec. 20, 2006 and in the PHY Interface for the PCI Express Architecture (PIPE), Version 1.00, Jun. 19, 2003 both of which are hereby incorporated by reference. A PCI Express compliant component is a component that conforms to the aforementioned PCI Express Base Specification, but may perform functions not defined in the aforementioned PCI Express Base Specification.

Figure 3:
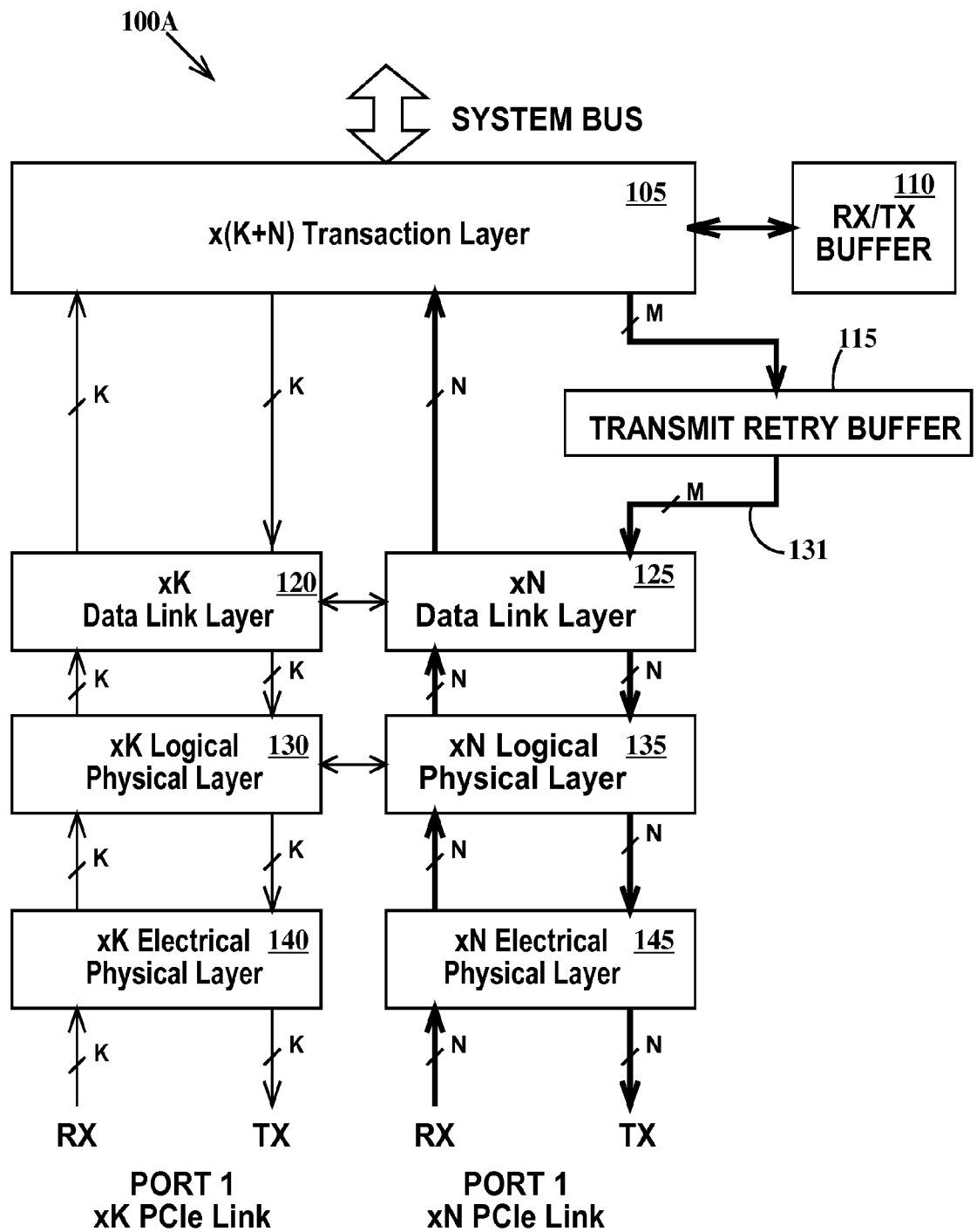
FIG. 3 is a diagram illustrating a PCI Express component having a single port configured for two links according to the present invention.

FIG. 3 is a diagram illustrating a PCI Express component having a single port configured for two links according to the present invention. In FIG. 3, a PCI Express component 100A includes a device, a x(K+N) transaction layer 105, a transmit/receive buffer 110, a transmit/retry buffer 115, a xK first data link layer 120, a xN second data link layer 125, a xK first logical physical link layer 130, a xN second logical physical layer 135, a xK first electrical physical layer 140 and a xN electrical physical layer 145.

Transaction layer 105 is connected to a computer system (not shown) by a system bus. Transaction layer 105 is connected to first data link layer 120 by K lanes, to data link layer 125 by N receive lanes and to transmit retry buffer 115 by an M-byte transmit bus. Allowed values for N and K are 1, 2, 4, 8, 12, 16 and 32. Transmit retry buffer 115 is connected to second data link layer 125 by an M-byte transmit bus 131. While numerical value of M may be less than the numerical value of N, it is more likely that the numerical value of M will be equal to the numerical value of N. First data link layer 120 is connected to second data link layer 125 in order to allow information to pass between the two data link layers. The responsibility of transaction layer 105 is the assembly of TLPs for transmission and disassembly of received TLPs.

First data link layer 120 is connected to first logical physical layer 130 by K transmit lanes and K receive lanes. Second data link layer 125 is connected to second logical physical layer 135 by N transmit lanes and N receive lanes. In general, the responsibility of data link layers is PCI Express link management and data integrity, including error detection and error correction. Note only second data link layer 125 transmits and receives TLPs. In a second example, second data link layer 125 generates and adds CRCs to TLPs being transmitted and checks the CRCs of received TLPs while first data link layer generates and consumes data link layer packets (DLLPs) that are used for PCI Express link management for both receive and transmit functions. First data link layer 120 is connected to second data link layer 125 in order to allow information to pass between the two data link layers. First and second data link layers 120 and 125 are implemented in hardware. In this case, second data link layer 125 adds CRCs to TLPs being transmitted and reads the CRCs of received TLPs while first data link layer 120 generates and consumes data link layer packets (DLLPs) that are used for PCI Express link management for both receive and transmit functions. Optionally, second data link layer 125 can also handle DLLPs.

First logical physical layer 130 is connected to first electrical physical layer 140 by K transmit lanes and K receive lanes. Second logical physical layer 135 is connected to second electrical physical layer 145 by N transmit lanes and N receive lanes. In general, logical physical layers direct control and management function of electrical physical layers. First and second logical physical layers 130 and 135 are implemented in hardware. First logical physical layer 130 is connected to second logical physical layer 135 in order to allow information to pass between the two logical physical layers.

First electrical physical layer 140 is connected to PORT 1 only by K transmit lanes and K receive lanes. Second electrical physical layer 145 is connected to PORT 1 only by N transmit lanes and N receive lanes. Physically, PORT 1 may be implemented, for example, as a socket on a motherboard or an edge connector on a printed circuit board. (A PORT 2 would be on a second component, not shown see FIG. 1, similar to component 10A. PORTs 1 & 2 and lanes K form the xK link and PORTs 1 & 2 and the N lanes form the xN link). First and second electrical physical layers 140 and 145 includes all circuitry for interface operation, including driver and input buffers. parallel-to-serial and serial-to-parallel conversions, clocking and impedance matching circuits. First and second electrical physical layers 140 and 145 are implemented in hardware. In general, during transmission, the responsibility of an electrical physical layer is to convert information received from a data link layer into an appropriate serialized format and to transmit that information across the PCI Express link at the supported PCI Express data rate. In general, during reception, the responsibility of an electrical physical layer is to receive information across the PCI Express link at the supported PCI Express data rate to convert information received to an appropriate format and pass the data onto a data link layer.

While only one transmit/retry buffer 115 is illustrated in FIG. 3, a second transmit/retry buffer must be implemented for data link layer 120 if TLPs transmission is to be supported by data link layer 120 to replace the K transmit lanes between transaction layer 105 and first data link layer 120. In this case, both first and second data link layers 120 and 125 add CRCs to TLPs being transmitted and read the CRCs of received TLPs as well as generate and consume data link layer packets (DLLPs) that are used for PCI Express link management for both receive and transmit functions.

Because there are two physical electrical layers, the xK PCIe Link on PORT 1 may run at a first maximum supported data rate and the xN PCIe Link on PORT 1 may run at a second first maximum supported data rate. The first and second maximum data rates may be the same or different. Because there are two data link layers, the widths of the PCI Express Links may be the same (K=N) or different (K<>N).

Before proceeding, it is useful to review some of the PCI Express power states. The L0 power state is the fully operational power state of a PCI Express component in which state TLPs and DLLPs can be transmitted. The L0s power state is a low latency, energy saving power state. Latency in this context is the time required to bring a PCI Express component to the L0 power state. L0s is required for Active State Power Management (ASPM). ASPM is a PCI Express feature that allows more options for hardware control of power reducing link states (specifically L0s and ASPM L1 power states) then available for standard PCI. TLP and DLLP transmission is disabled in the L0s power state. The L1 power state is a higher latency power saving state than L0s. The L2 power state is still higher latency aggressive power saving state. Transitions from one power state to another power state are controlled by a state machine. Only certain transitions are allowed. In general the power state of a PCI Express component is determined by the data link layer based on monitoring of packet traffic on the link.

In use, both a transmitting and receiving PCI Express component would be identically configured as shown in FIG. 3. In one scenario, in order to save power, K is less than N (e, g. K could be equal to 1 and N equal to 16) and the xK PCI Express Link runs at a minimum supported data rate (e.g. 2.5 GT/s) and the xN PCI Express Link runs at a maximum supported data rate (e.g. 5.0 GT/s) with TLP traffic using the xN PCI Express Link and DLLP traffic using the xK PCI Express Link.

Under the above scenario, TLPs are transmitted/received through the xN PCI Express Link of PORT 1 at the higher data rate and DLLPs are transmitted/received through the xK PCI Express Link at the lower data rate.

When a TLP is transmitted, the TLP is passed from transaction layer 105 to transmit/retry buffer 115 where a copy of the TLP is stored and then the TLP is passed to first data link layer 125 and through second logical physical layer 135, second electrical physical layer 145 onto the xN PCI Express Link. In a receiving component, an LCRC check and a sequence number check are performed when the TLP is received. If a TLP passes the LCRC and sequence number checks, then an acknowledgement (ACK) is sent to first data link layer 120 through the xK PCI Express Link, first electrical physical layer 140 and first logical physical layer 130 and the copy of the TLP is removed from retry/transmit buffer 115. If an error occurs during transmission of a TLP a negative acknowledgement (NAK) is sent by the receiving component to the transmitting component. For example, if a TLP fails the LCRC and/or sequence number checks then a NAK is sent and a copy of the TLP stored in transmit/retry buffer 115 is resent (replayed). The copy of the stored TLP can also be sent after a timeout waiting for an ACK. ACK and NAK signals are transmitted using DLLPs.

An advantage of this scenario is large packet traffic (e.g. TLP traffic) can easily be supported on the wide (xN) link without the penalty of flow control update and ACK/NAK (e.g. DLLP traffic) latency since this is handled on the narrow (xK) link. Power may be saved by running the narrow (xK) link at a lower data rate.

In other scenarios, during lulls in TLP traffic the width of the wide (xN) link is downshifted to a narrower width (fewer powered lanes), the wide (xN) link data rate (frequency) is reduced, the wide (xN) link can be transitioned into a lower power state (e.g. an L2 power state), the narrow (xK) link can transition in and out of lower latency link power states (e.g. L0 and L1 power states) in order to perform flow control updates or other link management tasks, or combinations thereof.

Figure 4:
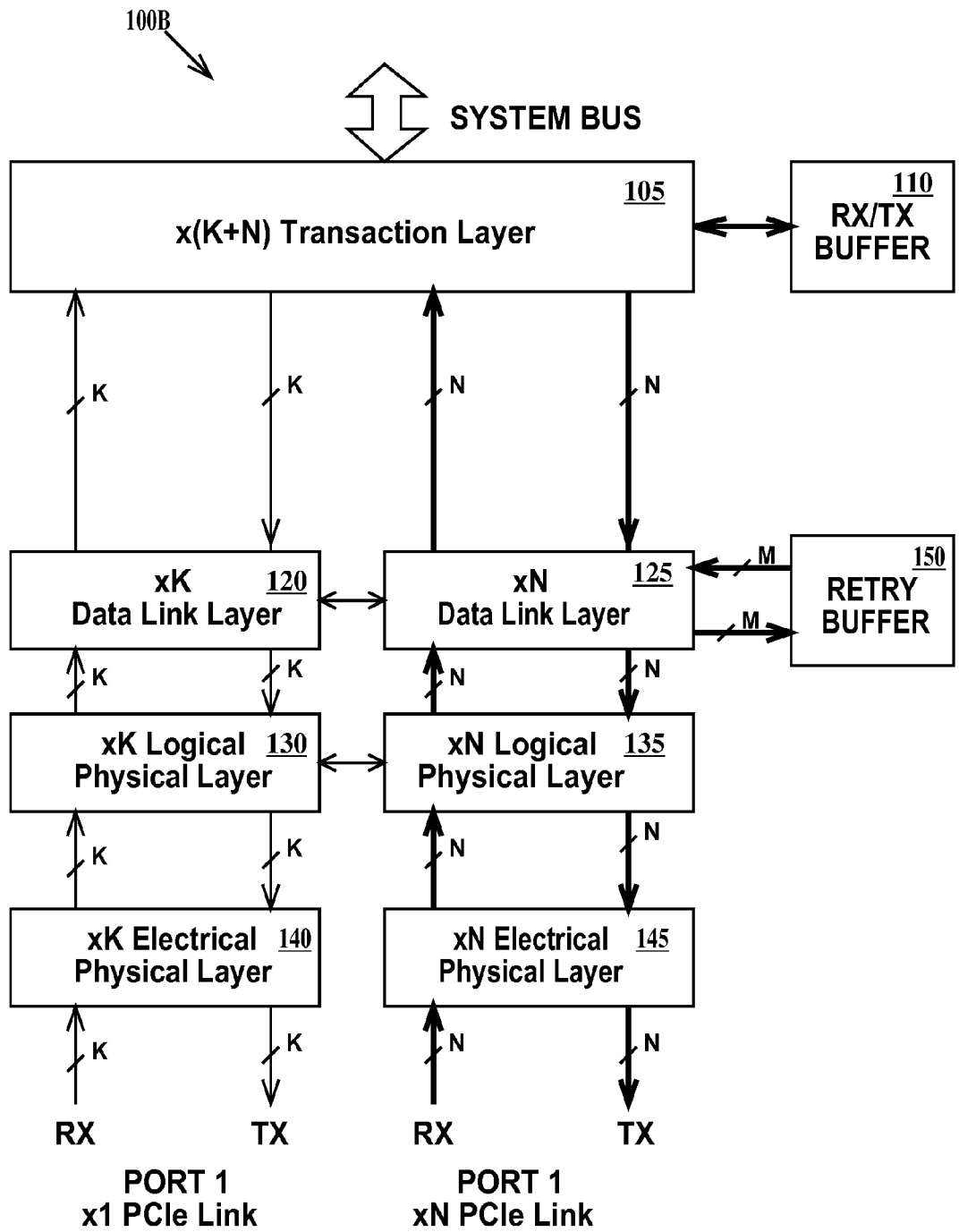
FIG. 4 is a diagram illustrating an alternative PCI Express component having a single port configured for two links according to the present invention.

FIG. 4 is a diagram illustrating an alternative PCI Express component having a single port configured for two links according to the present invention. In FIG. 4, a PCI Express component 100B is similar to PCI Express component 100A of FIG. 3 except transmit/retry buffer 115 of FIG. 3 is replaced with a retry buffer 150 and N transmit lanes connecting transaction layer 105 and second data link layer 125. Retry buffer 150 is connected to by an M-byte bus. While only one retry buffer 150 is illustrated in FIG. 4, a second retry buffer may be implemented and connected to first data link layer 120.

In use, both a transmitting and receiving PCI Express component would be identically configured as shown in FIG. 4. Operationally, the only difference between component 100A and 100B is TLPs are sent directly to second data link layer 125. Copies of TLPs are stored in the retry buffer.

Figure 5:
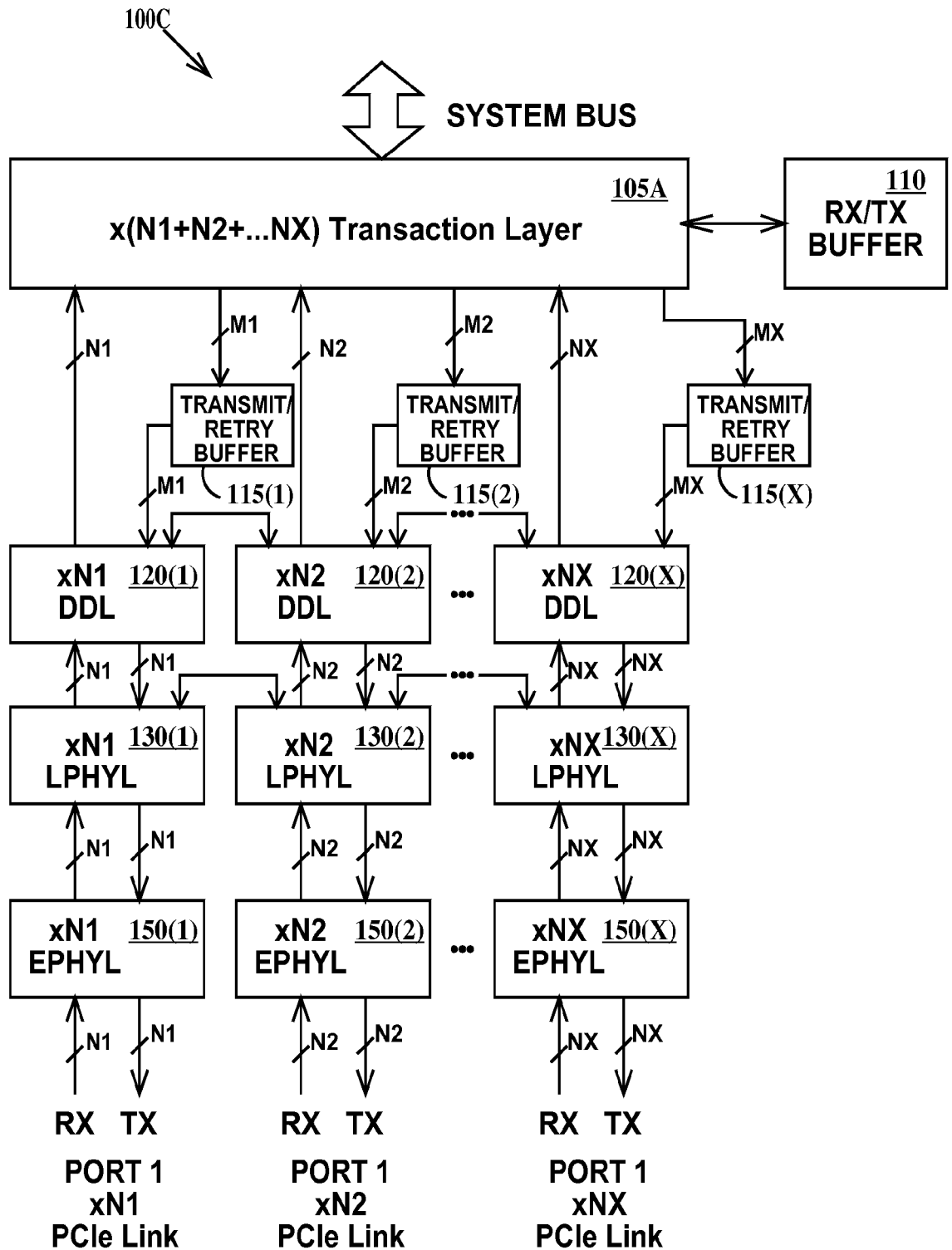
FIG. 5 is a diagram illustrating an generalized PCI Express component having a single port configured for multiple links according to the present invention.

FIG. 5 is a diagram illustrating a generalized PCI Express component having a single port configured for multiple links according to the present invention. In FIG. 5, PCI Express component 100C is a generalized version of PCI Express component 100A of FIG. 3. PCI Express component 100C includes a x(N1+N2+ . . . +NX) transaction layer 105A is connected to multiple data link layers 120(1), 120(2) . . . 120(X) by respective N1, N2 . . . NX receive lanes and through respective transmit/retry buffers 115(1), 115(2) . . . 115(X) by respective M1-byte, M2-byte . . . MX-byte buses. Some transmit/retry buffers may be replaced by transmit lanes having the same width as the corresponding receive lanes, though at least one data link layer should be connected to transaction layer 105A by a transmit/retry buffer.

Each data link layer 120(1), 120(2) . . . 120(X) is connected to a respective logical physical layer 130(1), 130(2) . . . 130(X) by respective N1, N2 . . . N3 transmit and receive lanes. Each logical physical layer 130(1), 130(2) . . . 130(X) is connected to a respective electrical physical layer 150(1), 150(2) . . . 150(X) by respective N1, N2 . . . N3 transmit and receive lanes.

In use, both a transmitting and receiving PCI Express component would be similarly configured as shown in FIG. 5. PCI Express component 100C is advantageously used when it is desired to configure the port to support separate links dedicated to certain types of traffic and/or data packet types. For example, one link would handle posted write requests, another would handle non-posted requests, and a third link would handle messages. Link widths for each type of traffic/packet would be assigned based on required bandwidth and each link could be up-configured and/or down-configured and/or the data rate could be changed and/or the link power state could be changed based on changes in traffic patterns across the links as required. Flow control updates could be sent on the lowest bandwidth link or if data buffering is aligned with the packet type assigned to a particular link, then flow control updates could be sent on the link with the corresponding transaction type. This could also be extended to ACK/NAK protocol and allocation of replay buffer resources (transmit/retry buffer or retry buffer) per link.

Alternatively, transmit retry buffers 115(1) through 115(X) may be replaced by retry buffers connected to respective data link layers 120(1) through 120(X) and N1 through NX transmit lanes between transaction layer 105A and respective data link layers 120(1) through 120(X) in a generalized version of PCI Express component 100B of FIG. 4. When retry buffers replace transmit/retry buffers, some retry buffers may be eliminated, though at least one data link layer should be connected to transaction layer 105A by a retry buffer.

Figure 6:
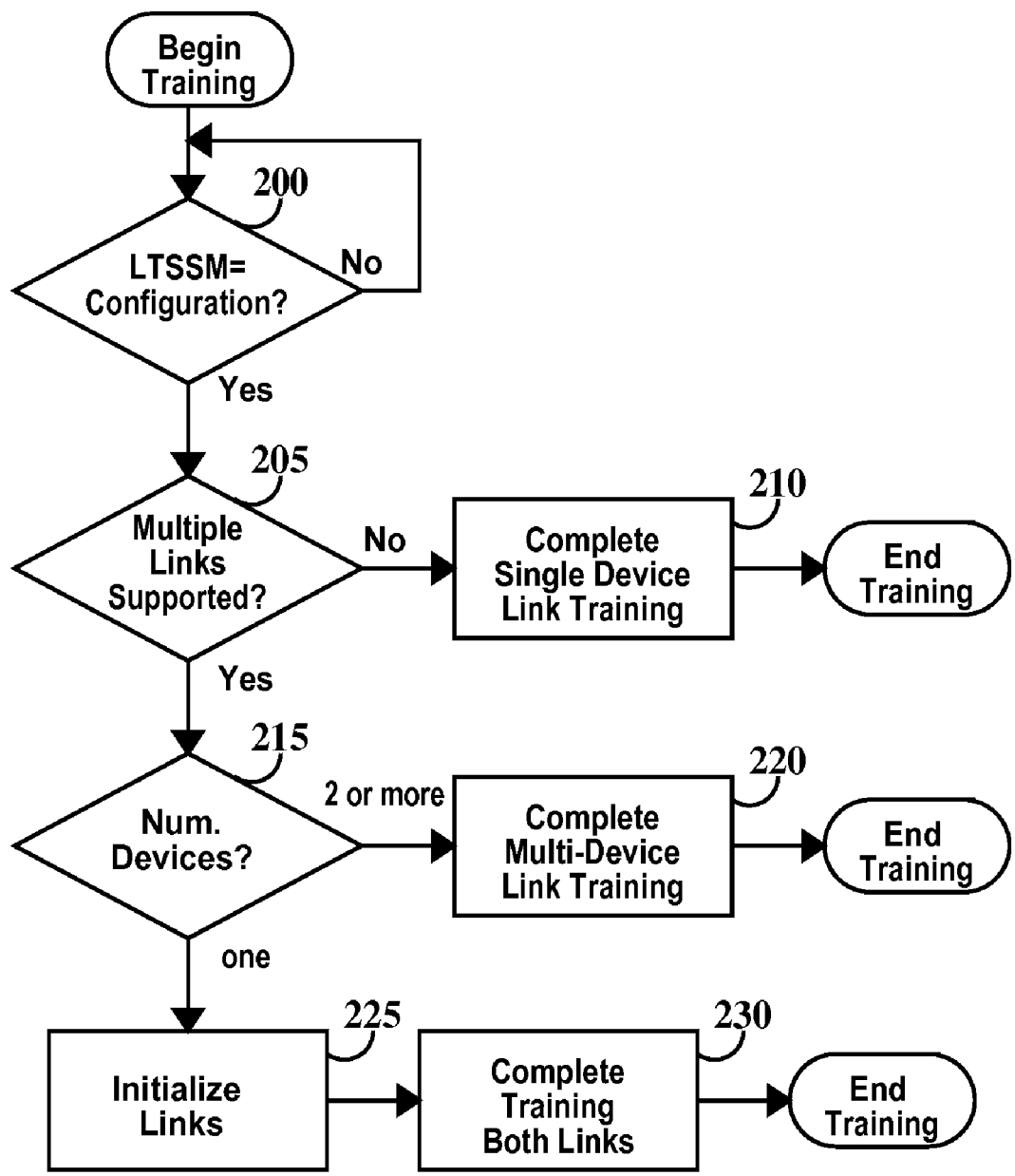
FIG. 6 is a flowchart illustrating the configuration of PCI Express components for multi-link operation on a single port according to the present invention.

FIG. 6 is a flowchart illustrating the configuration of PCI Express components for multi-link operation on a single port according to the present invention. In FIG. 6, it is assumed that a first PCI Express component supports multiple links too and wants to multiple-link to a second PCI Express component on a single port. In step 200 of FIG. 6, the first PCI Express component waits until the Link Training and Status State Machine (LTSSM) of both PCI Express components are in the configuration mode.

In step 205 the first PCI Express component determines if the second PCI Express component is capable of multiple links per port. A response from the second component of a single link number indicates it is not, while a response of multiple link numbers indicates it is. If multiple links are not supported, then in step 210 the first PCI component is trained as a component containing only one link per port and the present invention can not be practiced, the link between the first and second components being established as a normal single link/single port link. If multiple links per port are supported by the second component, then the method proceeds to step 215.

In step 215, it is determined if only one other PCI Express device is to be connected to the first PCI Express device or if two or more additional PCI Express devices are to be connected to the first PCI Express component. If two or more additional PCI Express components are to be linked to the first PCI Express component the present invention cannot be practiced. Then in step 220 the PCI Express components are trained to link to each other through separate links on a single port and the link between the multiple components being established as a normal multiple link/single port links. However, if in step 215, only the second PCI Express component is to be linked to the first PCI Express component, the method proceeds to step 225. It is possible to branch to step 220 from step 215 even if there is only one additional PCI Express component as described infra but generally this would serve no purpose.

In step 225, the first PCI Express component is set to initialize two (or more) links to the second PCI Express component. In one example there is at least one wide link and one narrower link, where the narrower link may be a x1 link. Link initialization is a process that builds unassociated lanes of a port into associated lanes that form a link. Then in step 230, the training of both the first and second PCI Express components is completed to establish a multiple-link/single port connection between the first and second PCI Express components according to the embodiments of the present invention.

It is important to realize a significant difference in the training protocol between step 220 and step 230 In step 220, N complete hardware stacks must be allocated including Y transaction layers, Y data link layers, Y physical layers, Y electrical physical layers, Y RX/TX buffers, and Y retry or transmit retry buffers where Y is a whole positive integer equal to or greater than 2 while in step 230 there is sharing of a single transaction layer and RX/TX buffer, Z data link layers, Z physical layers, Z electrical physical layers, one or Z RX/TX buffers, and one or Z retry or transmit retry buffers where Z is a whole positive integer equal to or greater than 2. Additionally in step 220, each PCI Express component may connect to one or more additional PCI Express components, while in step 230 each PCI Express component may connect to only one additional PCI Express component.

FIGS. 7, 8, 9, 10, 11 and 12 are particularly applicable to the case where a narrower link of two or more links is used for DLLP traffic and a wider link(s) is used for TLP traffic.

Figure 7:
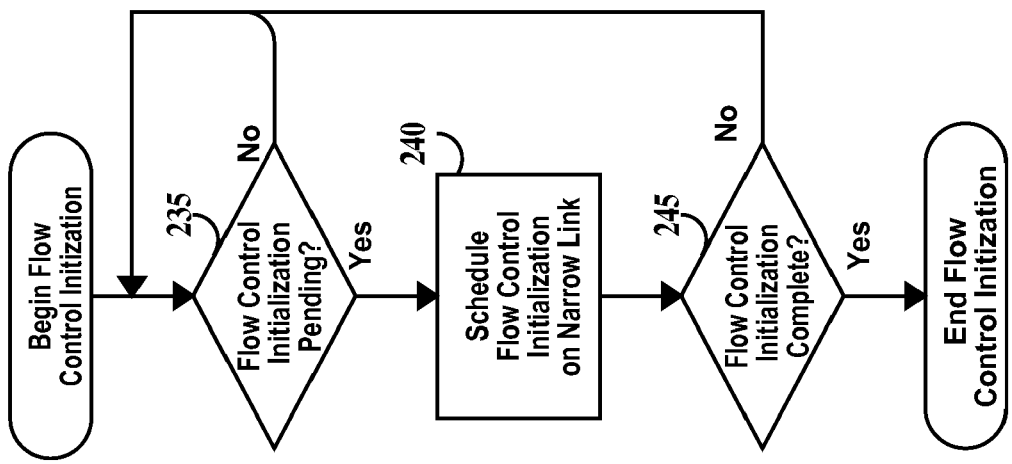
FIG. 7 is a flowchart illustrating the initialization of flow control between two PCI Express components for multi-link operation on a single port according to the present invention.

FIG. 7 is a flowchart illustrating the initialization of flow control between two PCI Express components for multi-link operation on a single port according to the present invention. Flow control is used to prevent overflow of receiver buffers (110 of FIGS. 3, 4 and 5 and to enable compliance with transaction ordering rules. Flow control must be initialized for each virtual channel of the port (essentially associating hardware resources with different types of traffic. FC Init DLLPs are a type of DLLP used for flow control initialization. Step 235 of FIG. 7, is a holding step that waits for flow control initialization to be pending. Once flow control initialization is pending, then in step 240, flow control initialization (FC Init DLLPs) is scheduled on the narrow link. Next in step 245 it is determined if flow control initialization is complete. If flow control initialization is complete, then flow control initialization is ended, otherwise the method loops back to step 235 and waits further flow control initialization (FC Init DLLPs) for the links to be pending. If DLLPs are not restricted to a narrow link, then flow control initialization may be scheduled over any specified link or links.

Figure 8:
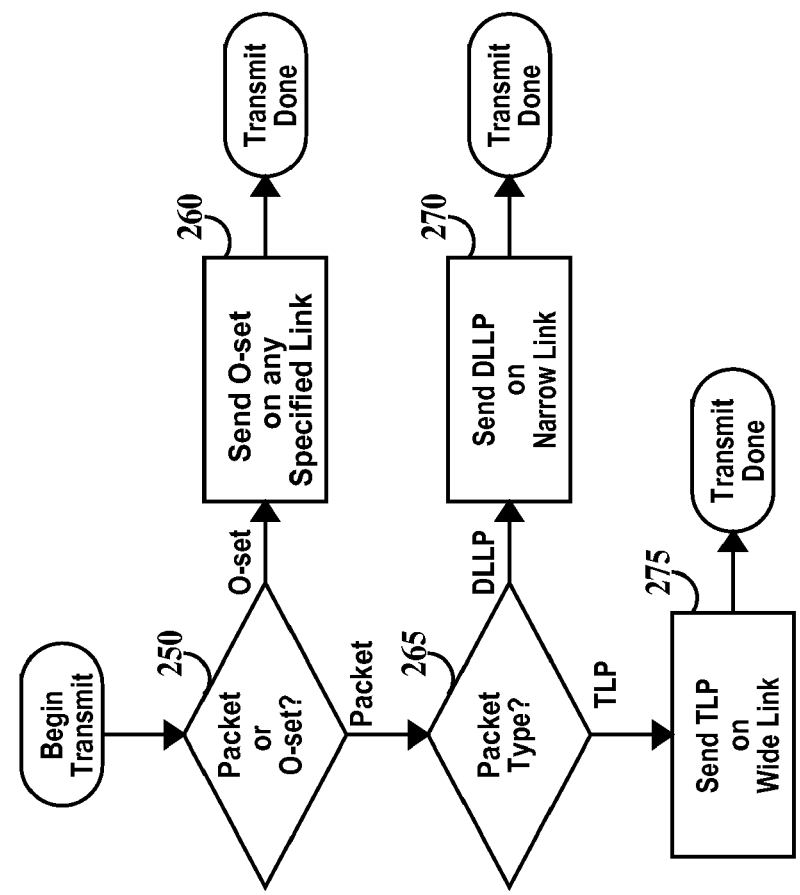
FIG. 8 is a flowchart illustrating the transmission of information between two PCI Express components according to the present invention.

FIG. 8 is a flowchart illustrating the transmission of information between two PCI Express components according to the present invention. In step 250 it is determined if the information to be transmitted by one of the two single-port/multiple link linked PCI Express components is of an ordered set (first framing class), or a DLLP or TLP packet (second framing class). An ordered set is a set of control codes sent between physical layers. If the information is an ordered set, then in step 260 the ordered set is transmitted on any specified link or links. If the information is a packet, the method proceeds to step 265. If in step 265, the packet type is DLLP then in step 270 the DLLP is transmitted on the narrow link. If in step 265, the packet type is TLP then in step 277 the TLP is transmitted on the wide link. If DLLPs are not restricted to a narrow link and TLPs to a wider link, ordered sets, DLLPs and TLPs may be sent on any specified link or links Note, TLPs are restricted to transmission on lanes having an associated retry buffer.

Figure 9:
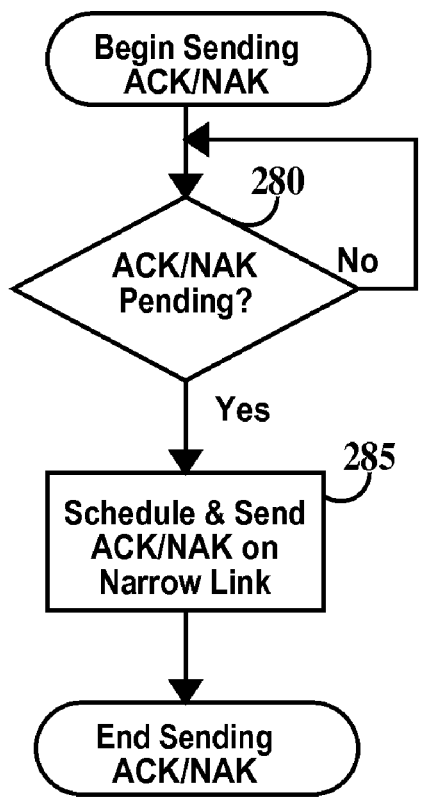
FIG. 9 is a flowchart illustrating sending of ACK/NAKs between two PCI Express components for multi-link operation on a single port according to the present invention.

FIG. 9 is a flowchart illustrating sending of ACK/NAKs between two PCI Express components for multi-link operation on a single port according to the present invention. Step 280 of FIG. 9, is a holding step that waits for an ACK or NAK (which is transmitted as a DLLP) to be pending. Once an ACK/NAK is pending, then in step 285, the ACK/NAK DLLP is scheduled and sent on the narrow link. If DLLPs are not restricted to a narrow link, then ACK/NAKs may be sent over any specified link or links.

Figure 10:
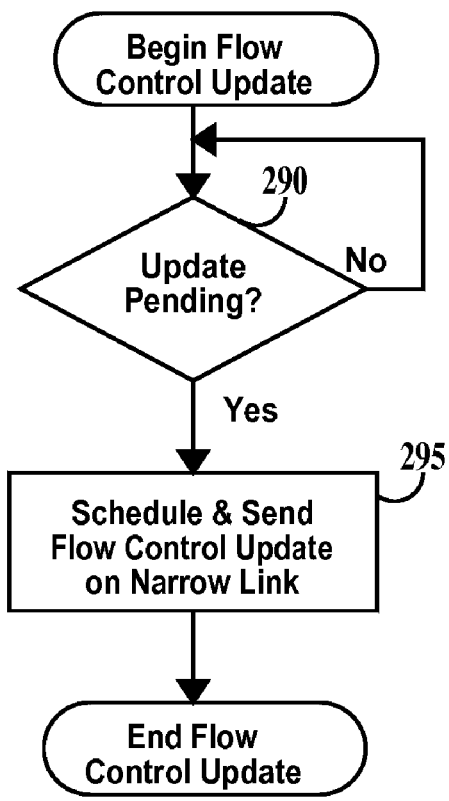
FIG. 10 is a flowchart illustrating flow control update between two PCI Express components for multi-link operation on a single port according to the present invention.

FIG. 10 is a flowchart illustrating flow control update between two PCI Express components for multi-link operation on a single port according to the present invention. Step 290 of FIG. 10, is a holding step that waits for a flow control update (which is transmitted as a DLLP) to be pending. Once a flow control update is pending, then in step 295, the flow control update is scheduled and sent on the narrow link. If DLLPs are not restricted to a narrow link, then flow control update may be performed over any specified link or links.

Figure 11:
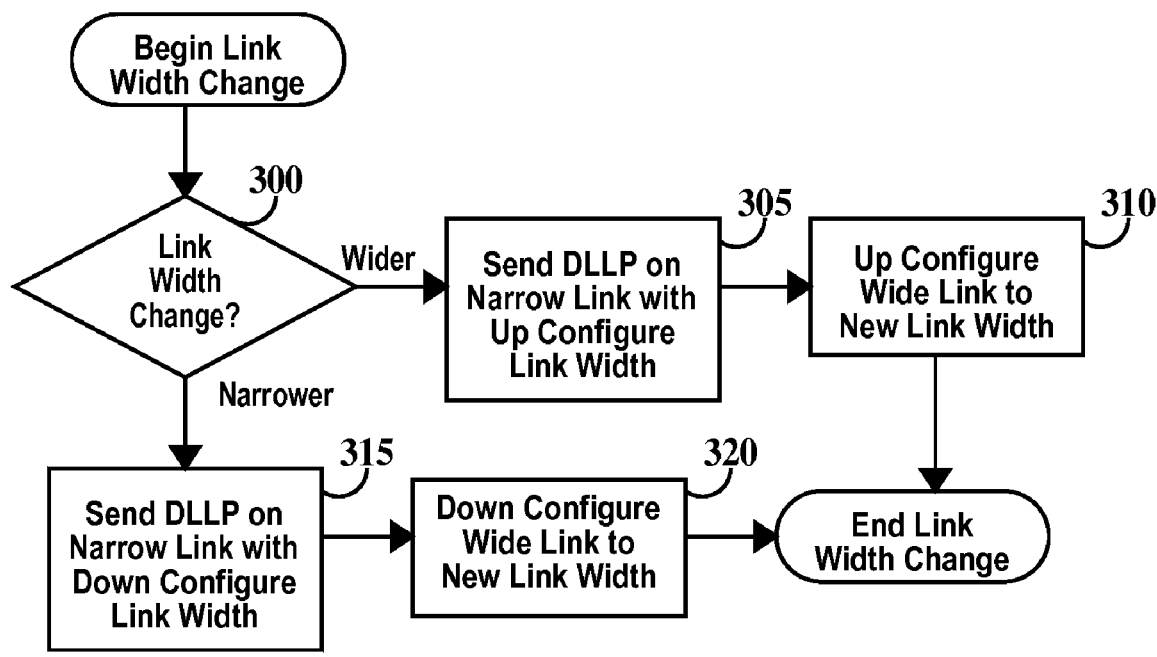
FIG. 11 is a flowchart illustrating changing the width of a wide link between two PCI Express components for multi-link operation on a single port according to the present invention.

FIG. 11 is a flowchart illustrating changing the width of a wide link between two PCI Express components for multi-link operation on a single port according to the present invention. In step 300 it is determined if the wide link is to be widened or narrowed. If the wide link is to be widened, then in step 305, a DLLP is sent on the narrow link to signal to the remote component to Up-configure the wide link width and next in step 310, the wide link is configured to the new width. If the wide link is to be narrowed, then in step 315, a DLLP is sent on the narrow link to signal to the remote component to Down-configure the wide link width and next in step 320, the wide link is configured to the new width.

Figure 12:
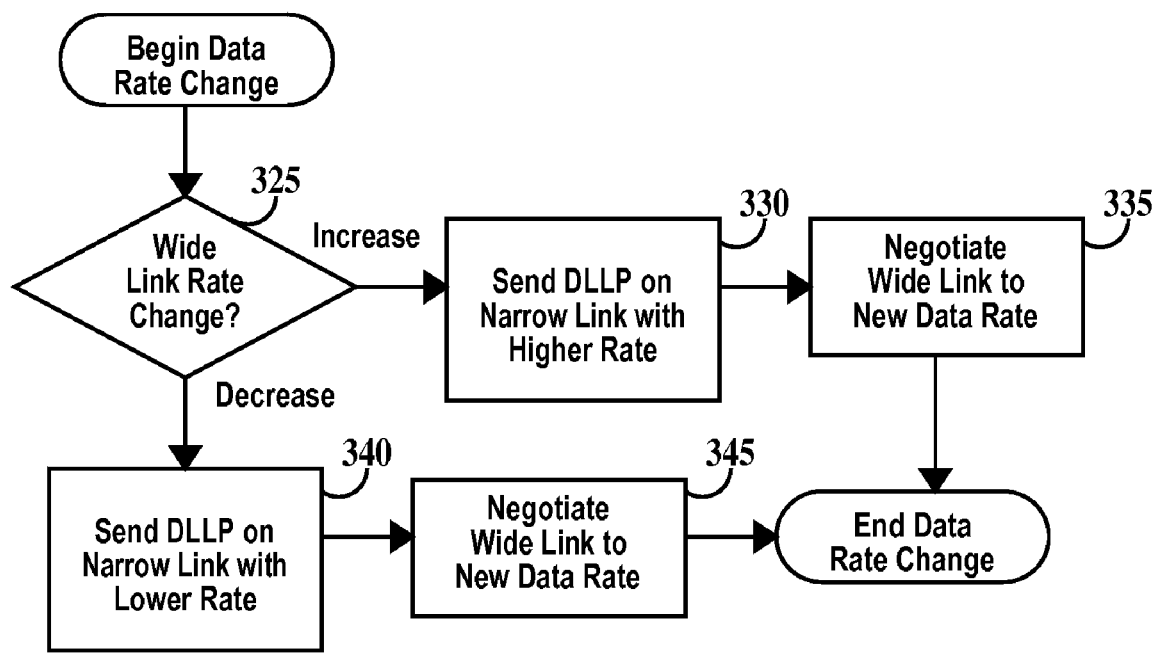
FIG. 12 is a flowchart illustrating changing the data rate of a wide link data between two PCI Express components for multi-link operation on a single port according to the present invention.

FIG. 12 is a flowchart illustrating changing the data rate of a wide link data between two PCI Express components for multi-link operation on a single port according to the present invention. In step 325 it is determined if the wide link data rate is to be increased or decreased. If the wide link data rate is to be increased, then in step 330, a DLLP is sent on the narrow link with the higher data rate for the wide link and next in step 335, the wide link data rate is negotiated to the new wide link data rate. If the wide link data rate is to be decreased, then in step 340, a DLLP is sent on the narrow link with the lower data rate for the wide link and next in step 345, the wide link data rate is negotiated to the new wide link data rate.

Figure 13A:
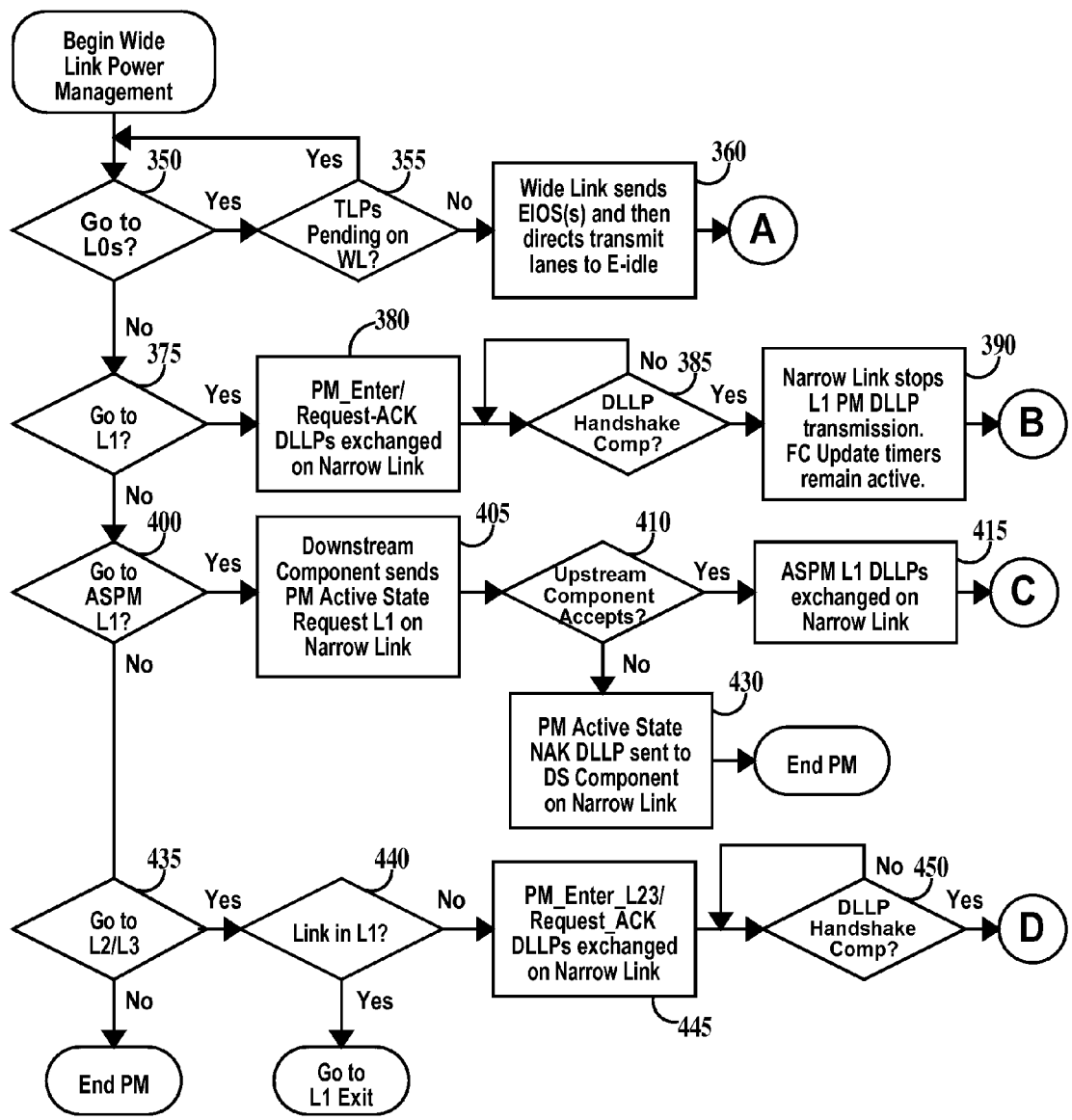
FIGS. 13A and 13B are a single flowchart illustrating how power management is performed on a PCI Express component according to the present invention.
Figure 13B:
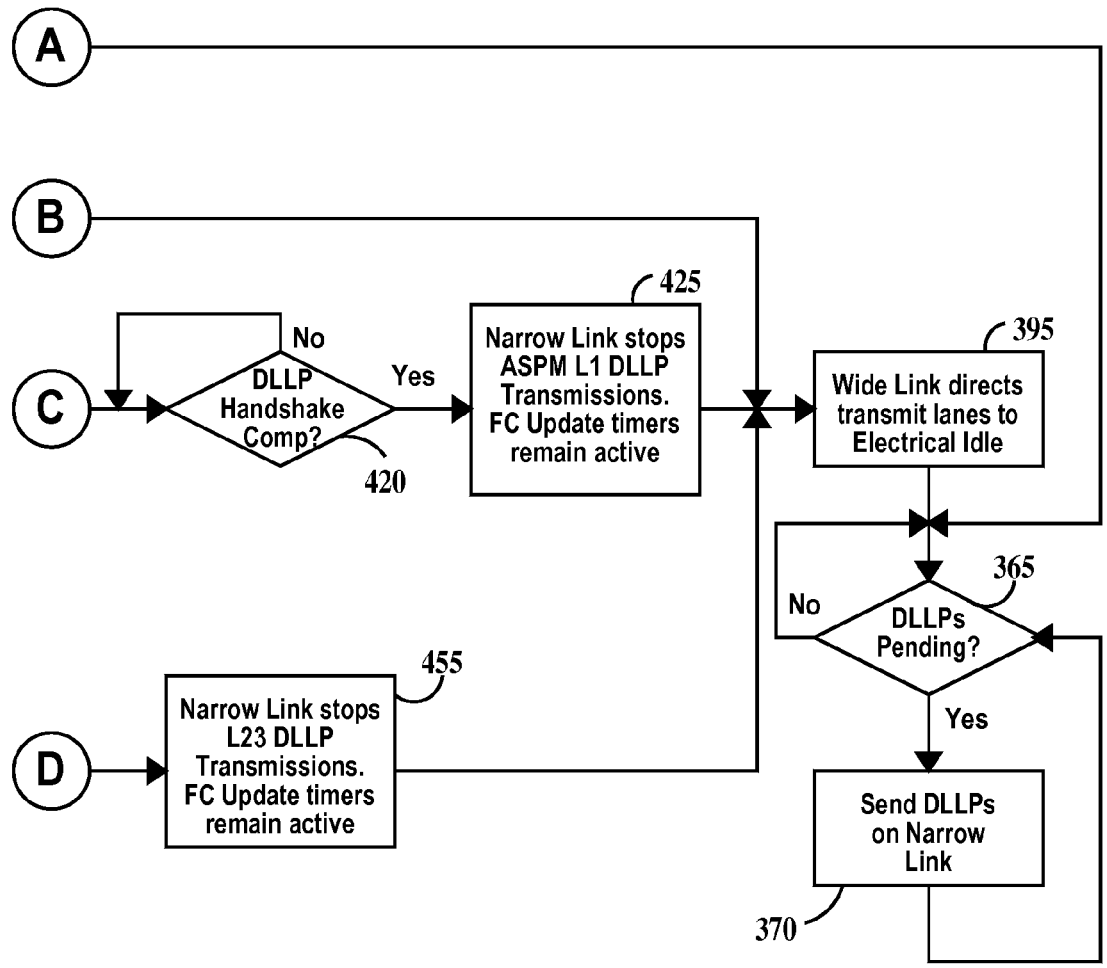
Figure 14:
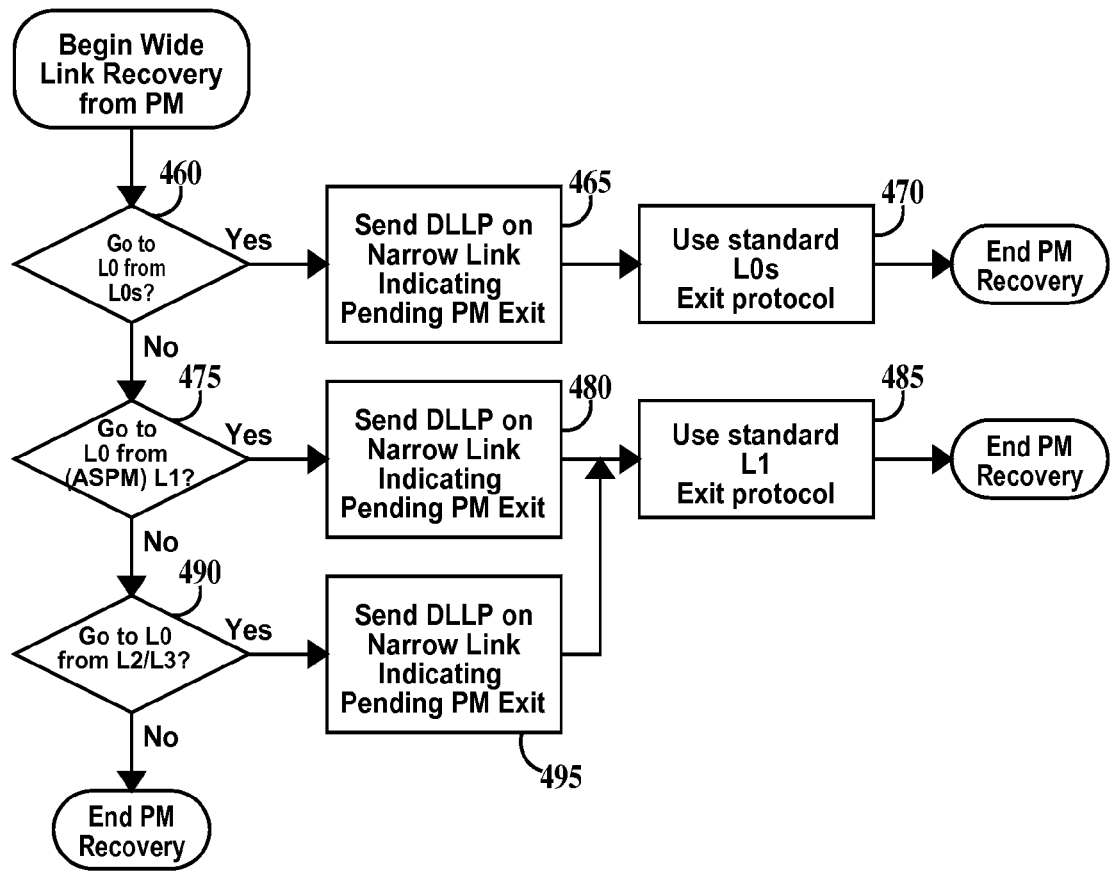
FIG. 14 is a flowchart illustrating link recovery from a power management event for a PCI Express component according to the present invention.

In describing FIGS. 13A, 13B and 14 the terms wide and narrow link will be used. These terms describe the case where N>K in FIGS. 3 and 4 and particularly the case where K=1 and N>1. FIGS. 13A, 13B and 14 may also be used in the general case of FIG. 5 by substituting the terms "selected link" for the wide link and "other links" for the narrow link.

FIGS. 13A and 13B are a single flowchart illustrating how power management (PM) is performed on a PCI Express component according to the present invention. PCI Express power states have been described supra. An upstream component is the PCI Express component which is power managed in FIGS. 13A and 13B. A downstream component is the PCI Express component to which the upstream component is linked. Both the upstream and downstream components are power managed. PCI Express power management begins with the wide link. In step 350 it is determined if the PCI Express component should go to the L0s power state. If the PCI component goes to the L0s power state then the method proceeds to step 355. In step 355 it is determined if any TLPs are pending on the wide link. If there are then the method loops back to step 350, otherwise the method proceeds to step 360. In step 360 the wide link data link layer sends an electrical idle ordered set (EIOS) to the proper layers of the downstream component and then directs transmit lanes of the wide link to electrical idle. Next in step 365 (via connector A to FIG. 13B) it is determined if any DLLPs are pending. If in step 365, DLLPs are pending then in step 370 the DLLPs are sent on the narrow link. This loop continues until all DLLPs have been sent and the transition is complete.

Returning to step 350, if the PCI Express component is not to go to the L0s power state the method proceeds to step 375. In step 375 it is determined if the PCI Express component should go to the L1 power state. If the PCI component goes to the L1 power state then the method proceeds to step 380. In step 380, PM_Enter/Request-ACK DLLPs are exchanged on the narrow link between the upstream and downstream PCI Express components and the method proceeds to step 385. In step 385 it is determined if the DLLP handshaking is complete. If, not the method waits until the handshake is complete before proceeding to step 390. In step 390, the narrow link stops L1 power management DLLP transmissions. The flow control (FC) timers remain active.

Flow control is a mechanism wherein TLPs are not transmitted on a link unless there are adequate Flow Control Credits. In this scheme, a first PCI Express component sends an initial amount of credit for each of the receive buffers in its transaction layer to a second PCI Express component. The second PCI Express component, at the opposite end of the link, when sending TLPs to the first PCI Express component will count the number of credits consumed by each TLP it sends. The second PCI Express component can only send TLPs when doing so does not result in consuming more credits than available in its account for the first PCI Express component. When the first PCI Express component finishes processing a TLP in its receive buffer, it returns credits to the second PCI Express component.

FC Credit information managed by the transaction layer and is exchanged via FC DLLPs. FC timers determine when PM transitions should occur because a certain activity has not occurred within the timeout period of the timer. FC Update DLLPs are transmitted and received only on the narrow link which enables the wide link to remain in the low power link state for longer periods of time without needing to transition back to L0 in order to send FC Updates. The method then proceeds to step 395 of FIG. 13B via connector B. In step 395 the wide link directs transmit lanes to electrical idle and the method proceeds to step 365.

Returning to step 375, if the PCI Express component is not to go to the L1 power state the method proceeds to step 400. In step 400 it is determined if the PCI Express component should go to the ASPM L1 power state. If the PCI component goes to the ASPM L1 power state then the method proceeds to step 405. In step 405, the downstream component sends a PM_Active State Request L1 DLLP on the narrow link to the upstream component and in step 410 it is determined if the upstream component accepts. If the upstream component does not accept then in step 430 a PM Active STATE NAK DLLP is sent to the downstream component and the current power management sequence is terminated. If the upstream component accepts, then in step 415 ASPM L1 DLLPs are exchanged between the upstream and downstream components on the narrow link and the method proceeds to step 420 of FIG. 13B via connector C.

In step 420 it is determined if the DLLP handshaking is complete. If, not the method waits until the handshake is complete before proceeding to step 425. In step 425, the narrow link stops ASPM L1 power management DLLP transmissions. The FC update timers remain active.

Keeping the timers active is a modification of the current PCIe 2.0 Base Specification, which requires the timers to be suspended. Because FC credits may not be available to immediately send a TLP when exiting these low power link states, keeping the timers active and continuing to send FC Updates on the narrow link the exit from these lower power link states is quicker (lower latency to send a TLP) since it is likely that there will be FC credits available for TLP transmission.

Returning to step 400, if the PCI Express component is not to go to the ASPM L1 power state the method proceeds to step 435. In step 435 it is determined if the PCI component should go to the L2/L3 power states. If the PCI component goes to the L2/L3 power states then the method proceeds to step 440, otherwise the current PM sequence is terminated. In step 440, it is determined if the PCI Express component is in the L1 power state. If the PCI Express component is not in the L1 power state the method proceeds to step 445, other wise L1 Exit protocol is executed and the current PM sequence is terminated. In step 445, PM_Enter_L23/Request_ACK DLLPs are exchanged between the upstream and downstream components on the narrow link and in step 450 it is determined if the DLLP handshaking is complete. If, not the method waits until the handshake is complete before proceeding to step 455 of FIG. 13B via connector D.

In step 455, the narrow link stops L23 DLLP transmissions. The FC update timers remain active and the method proceeds to step 395.

FIG. 14 is a flowchart illustrating link recovery from a power management event for a PCI Express component according to the present invention. In step 460, it is determined if the upstream PCI Express component is to go to the L0 power state from the L0s power state. If the transition is from L0s to L0, then the method proceeds to step 465, otherwise the method proceeds to step 475. In step 465, a DLLP indicating a pending PM Exit is to occur is sent from the upstream to the downstream component and in step 470 a L0s Exit protocol is executed. This ends the current PM recovery sequence.

In step 475, it is determined if the upstream PCI Express component is to go to the L0 power state from the L1 or from the ASPM L1 power state. If the transition is from L1 or ASPM L1 to L0 then the method proceeds to step 480, otherwise the method proceeds to step 490. In step 480, a DLLP indicating a pending PM Exit is to occur is sent from the upstream to the downstream component and in step 485 a L1 Exit protocol is executed. This ends the current PM recovery sequence.

In step 490, it is determined if the upstream PCI Express component is to go to the L0 power state from the L2/L3 power state. If the transition is from L2/L3 to L0, then the method proceeds to step 495, otherwise the current PM recovery sequence terminates. In step 495, a DLLP indicating a pending PM Exit is to occur is sent from the upstream to the downstream component and the method proceeds to step 485. For the pending PM exit, since the narrow link is assumed active and a normal PM exit takes some time, the 'early' DLLP notification serves as an enabler for the remote component (either component is considered remote if the local component is initiating the PM exit) to get ready for the exit for a quicker recovery.

Thus the present invention provides methods to more efficiently utilize bandwidth and power in PCI Express components.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
   connecting a first bus interface component to a second bus interface component with a first link consisting of a set of K lanes consisting of K unidirectional and differentially driven transmit lanes and K unidirectional and differentially driven receive lanes and a second link consisting of set of N lanes consisting of N unidirectional and differentially driven transmit lanes and N unidirectional and differentially driven receive lanes, wherein K and N are independently positive integers equal to or greater than 1; and
   transmitting and receiving transaction layer packets only over said set of N lanes and transmitting and receiving data link layer packets only over said set of K lanes.

2. The method of claim 1, further including:
   configuring said first bus interface component into first and second data link layers, first and second physical layers and a single first transaction layer, said first data link layer connected between said first transaction layer and said first physical layer and said second data link layer connected between said second physical layer and said first transaction layer, said first physical layer connected to said K lanes and not connected to said N lanes and said second physical layer connected to said N lanes and not connected to said K lanes; and
   configuring said second bus interface component into third and fourth data link layers, third and fourth physical layers and a single second transaction layer, said third data link layer connected between said second transaction layer and said third physical layer and said fourth data link layer connected between said fourth physical layer and said second transaction layer, said third physical layer connected to said K lanes and not connected to said N lanes and said fourth physical layer connected to said N lanes and not connected to said K lanes.

3. The method of claim 2, further including:
   connecting a first transmit and retry buffer between said first transaction layer and said second data link layer or connecting a first retry buffer to said second data link layer; and
   connecting a second transmit and retry buffer between said second transaction layer and said fourth data link layer or connecting a second retry buffer to said fourth data link layer.

4. The method of claim 1, wherein K is less than N.

5. The method of claim 1, wherein K is 1 and N is greater than 1.

6. The method of claim 5, further including:
   transitioning said set of K lanes from an active power state to a power saving state during lulls in transmitting and receiving of data link layer packets; and
   transitioning said set of K lanes from said power saving state to said active power state prior to transmitting or receiving of data link layer packets.

7. The method of claim 1, wherein a link data rate of a link comprised of said set of K lanes is less than a link data rate of a link comprised of said set of N lanes.

8. The method of claim 1, wherein a link data rate of a link comprised of said set of K lanes is the same as a link data rate of a link comprised of said set of N lanes.

9. The method of claim 1, further including:
   down configuring said second link to use a reduced number of lanes of said set of N lanes during lulls or reductions in volume of transmitting and receiving of transaction layer packets over said set of N lanes; and
   up configuring said second link to use an increased said number of lanes of said set of N lanes prior to a resumption or to an increase in volume of transmitting or receiving of transaction layer packets.

10. The method of claim 1, further including:
    configuring said second link to reduce a data rate of said set of N lanes during lulls or reductions in volume in transmitting and receiving of transaction layer packets; and,
    configuring said second link to increase said data rate of said set of N lanes prior to a resumption or to an increase in transmitting or receiving of transaction layer packets.

11. The method of claim 1, further including:
    transitioning said set of N lanes from an active power state to a power saving state during lulls in transmitting and receiving of transaction layer packets; and transitioning said set of N lanes from said power saving state to said active power state prior to transmitting or receiving of transaction layer packets.

12. The method of claim 1, wherein said first and second bus interface components are Peripheral Component Interconnect (PCI) Express compliant.

13. A method, comprising:
connecting a first bus interface component to second bus interface component with X links, each link of said X links comprising respective N1 to NX sets of lanes, each lane of each set of N1 to NX sets of lanes consisting of respective N1 to NX unidirectional and differentially driven transmit lanes and respective N1 to NX unidirectional and differentially driven receive lanes, wherein X is a whole positive integer equal to or greater than 3 and each N1 to NX is independently a positive integer equal to or greater than 1; and
transmitting and receiving data link layer packets over different one or more of said X links than said transaction layer packets are transmitted and received over and transmitting and receiving transaction layer packets over different one or more of said X links than said data link layer packets are transmitted and received over.

14. The method of claim 13, further including:
configuring said first bus interface component into X first data link layers, X first physical link layers and a single first transaction layer, each of said X first data links connected between said single first transaction layer and corresponding and respective physical link layer of said X first physical link layers, each first physical link layer of said X first physical link layers connected to a respective set of said N1 to NX sets of lanes; and
configuring said second bus interface component into X second data link layers, X first physical link layers and a single second transaction layer, each of said X second data links connected between said single second transaction layer and corresponding and respective physical link layer of said X second physical link layers, each second physical link layer of said X second physical link layers connected to a respective set of said N1 to NX sets of lanes.

15. The method of claim 14, further including:
connecting one or more first transmit and retry buffers between said first transaction layer and one or more data link layers of said X first data link layers, no first transmit and retry buffer connected to more than one data link layer of said X first data link layers or connecting at least one or more first retry buffers to one or more data link layers of said X first data link layers, no first retry buffer connected to more than one data link layer of said X first data link layers; and
connecting one or more second transmit and retry buffers between said second transaction layer and one or more data link layers of said X second data link layers, no second transmit and retry buffer connected to more than one data link layer of said X second data link layers or connecting at least one or more first retry buffers to one or more data link layers of said X second data link layers, no second retry buffer connected to more than one data link layer of said X second data link layers.

16. The method of claim 15, further including:
transmitting and receiving transaction layer packets over links of said X links that are connected to first transmit and retry buffers, second transmit and retry buffers, first retry buffers, or second retry buffers.

17. The method of claim 13, further including:
transmitting and receiving data link layer packets over links of said X links having data rates less than data rates of links of said X links that said transaction layer packets are transmitted and received over; and transmitting and receiving transaction layer packets over links of said X links having data rates greater than data rates of links of said X links that said data link layer packets are transmitted and received over.

18. The method of claim 13, further including:
transmitting and receiving data link layer packets over links of said X links having less lanes than links of said X links that said transaction layer packets are transmitted and received over; and
transmitting and receiving transaction layer packets over links of said X links having more lanes than links of said X links that said data link layer packets are transmitted and received over.

19. The method of claim 13, further including:
(a) configuring links of said X links to reduce a number of lanes of said links of said X links used for transmitting and receiving transaction layer packets during lulls or reductions in volume of transmitting and receiving of transaction layer packets and configuring links of said X links to increase said number of lanes of said links of said X links used for transmitting and receiving transaction layer packets prior to a resumption or to an increase in receiving or transmitting transaction layer packets; or
(b) configuring links of said X links to reduce a data rate of said lanes of links of said X links used for transmitting and receiving transaction layer packets during lulls or reductions in volume of transmitting and receiving of transaction layer packets and configuring links of said X links to increase said data rate of said lanes of said links of said X links used for transmitting and receiving transaction layer packets prior to a resumption or to an increase in receiving or transmitting transaction layer packets; or
(c) transitioning from an active to a power saving state links of said X links used for transmitting and receiving transaction layer packets during lulls or reductions in volume of transmitting and receiving of transaction layer packets and transitioning from said power saving state to said active state said links of said X links used for transmitting and receiving transaction layer packets prior to a resumption or to an increase in receiving or transmitting transaction layer packets; or
(d) transitioning from an active to a power saving state links of said X links used for transmitting and receiving data link layer packets during lulls in transmitting and receiving of data link layer packets and transitioning from said power saving state to said active state said links of said X links used for transmitting and receiving data link layer packets prior to receiving or transmitting data link layer packets; or
(e) simultaneously performing combinations of (a), (b), (c) and (d).

20. The method of claim 13, wherein said first and second bus interface components are Peripheral Component Interconnect (PCI) Express compliant.

21. An apparatus, comprising:
a first bus interface component;
a second bus interface component;
a first link having a set of K lanes connecting said first and second bus interface components, each lane of said set of K lanes consisting of K unidirectional and differentially driven transmit lanes and K unidirectional and differentially driven receive lanes;
a second link having a set of N lanes connecting said first and second bus interface components, each lane of said set of N lanes consisting of N unidirectional and differentially driven transmit lanes and N unidirectional and differentially driven receive lanes;
wherein K and N are independently positive integers equal to or greater than 1;

wherein said apparatus is Peripheral Component Interconnect (PCI) Express compliant; and wherein said first and second bus interface components are configured to transmit and receive transaction layer packets only over said set of N lanes and to transmit and receive data link layer packets only over said set of K lanes.

22. An apparatus, comprising:

a first bus interface component;

a second bus interface component;

X links connecting said first bus interface component to said second bus interface component, each link of said X links comprising respective N1 to NX sets of lanes, each lane of each set of N1 to NX sets of lanes consisting of respective N1 to NX unidirectional and differentially driven transmit lanes and respective N1 to NX unidirectional and differentially driven receive lanes, wherein X is a whole positive integer equal to or greater than 3 and each N1 to NX is independently a whole positive integer equal to or greater than 1;

wherein said apparatus is Peripheral Component Interconnect (PCI) Express compliant; and wherein said first and second bus interface components are configured to transmit and receive transaction layer packets only over a first subset of said set of N1 to NX sets of lanes and to transmit and receive data link layer packets only over a second subset of said set of N1 to NX sets of lanes, said first and second subsets of lanes including different sets of said set of N1 to NX sets of lanes.

* * * * *